United States Patent [19]
Meadows

[11] 3,975,583
[45] Aug. 17, 1976

[54] EMERGENCY CIVIL DEFENSE ALARM AND COMMUNICATIONS SYSTEMS

[75] Inventor: Talmadge W. Meadows, Decatur, Ala.

[73] Assignee: First National Bank of Decatur, Alabama, Decatur, Ala.

[22] Filed: Oct. 7, 1974

[21] Appl. No.: 512,968

[52] U.S. Cl. ............................ 178/5.6; 325/308; 325/57; 178/DIG. 13
[51] Int. Cl.² .................................. H04N 7/18
[58] Field of Search ............ 325/31, 55, 57, 64, 325/53, 308, 309, 466; 178/5.6, DIG. 13, DIG. 23; 340/310 R

[56] References Cited
UNITED STATES PATENTS

| | | | |
|---|---|---|---|
| 3,130,396 | 4/1964 | Hughes et al. | 325/308 |
| 3,521,168 | 7/1970 | Kaiser et al. | 325/57 |
| 3,761,914 | 9/1973 | Hardy et al. | 178/DIG. 13 |
| 3,860,746 | 1/1975 | Takeuchi | 178/DIG. 13 |
| 3,876,940 | 4/1975 | Wickord et al. | 325/64 |

*Primary Examiner*—Robert L. Griffin
*Assistant Examiner*—Jin F. Ng
*Attorney, Agent, or Firm*—Craig & Antonelli

[57] ABSTRACT

In a cable television distribution system, an emergency pre-empt system is located at a transmission station separate from the distribution station. This pre-empt system contains circuitry for interrupting the normal distribution of cable television signals and for enabling an emergency operator to present desired audio and video information to the viewers of the receivers serviced by the distribution system irrespective of the channel to which a receiver may be tuned.

12 Claims, 3 Drawing Figures

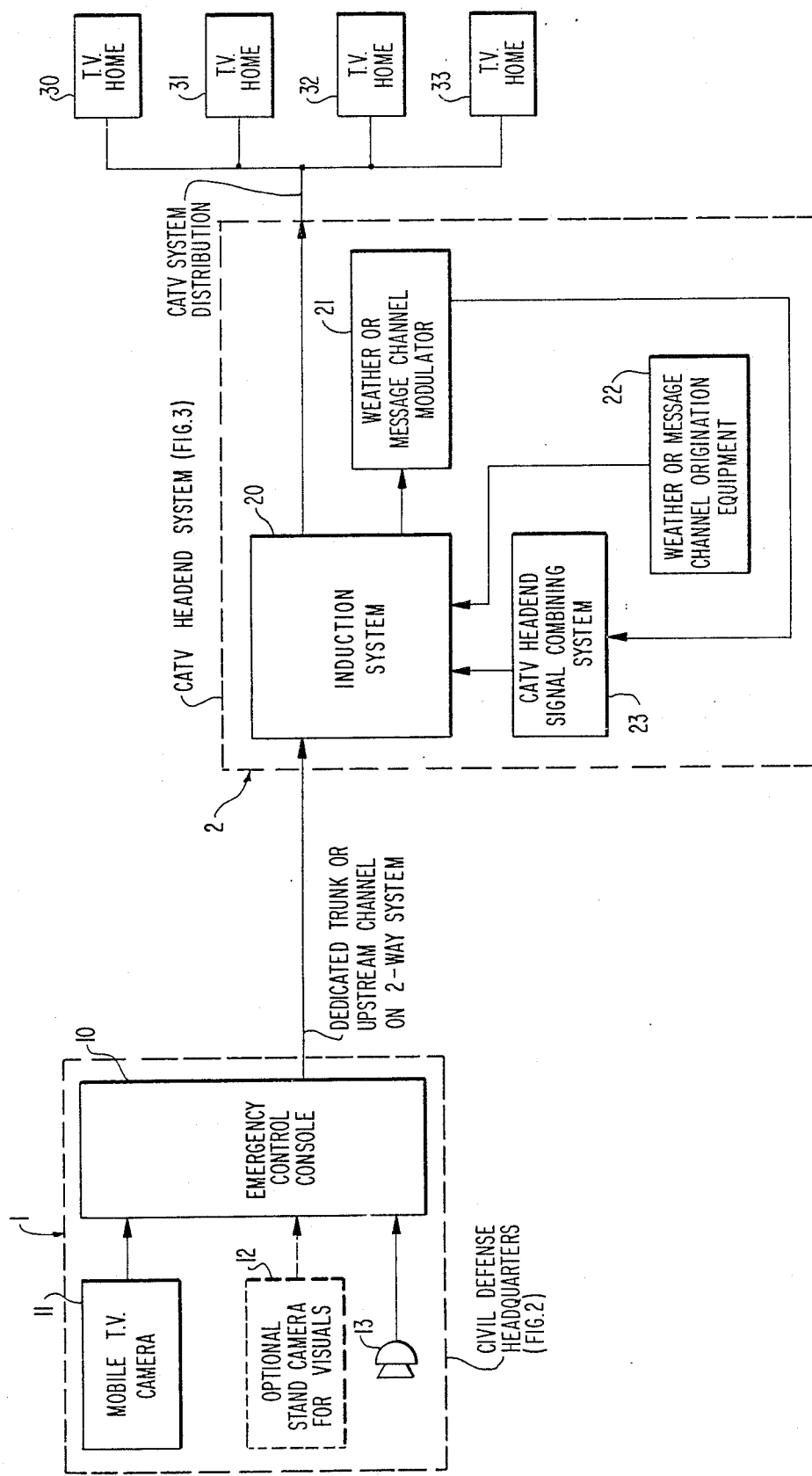

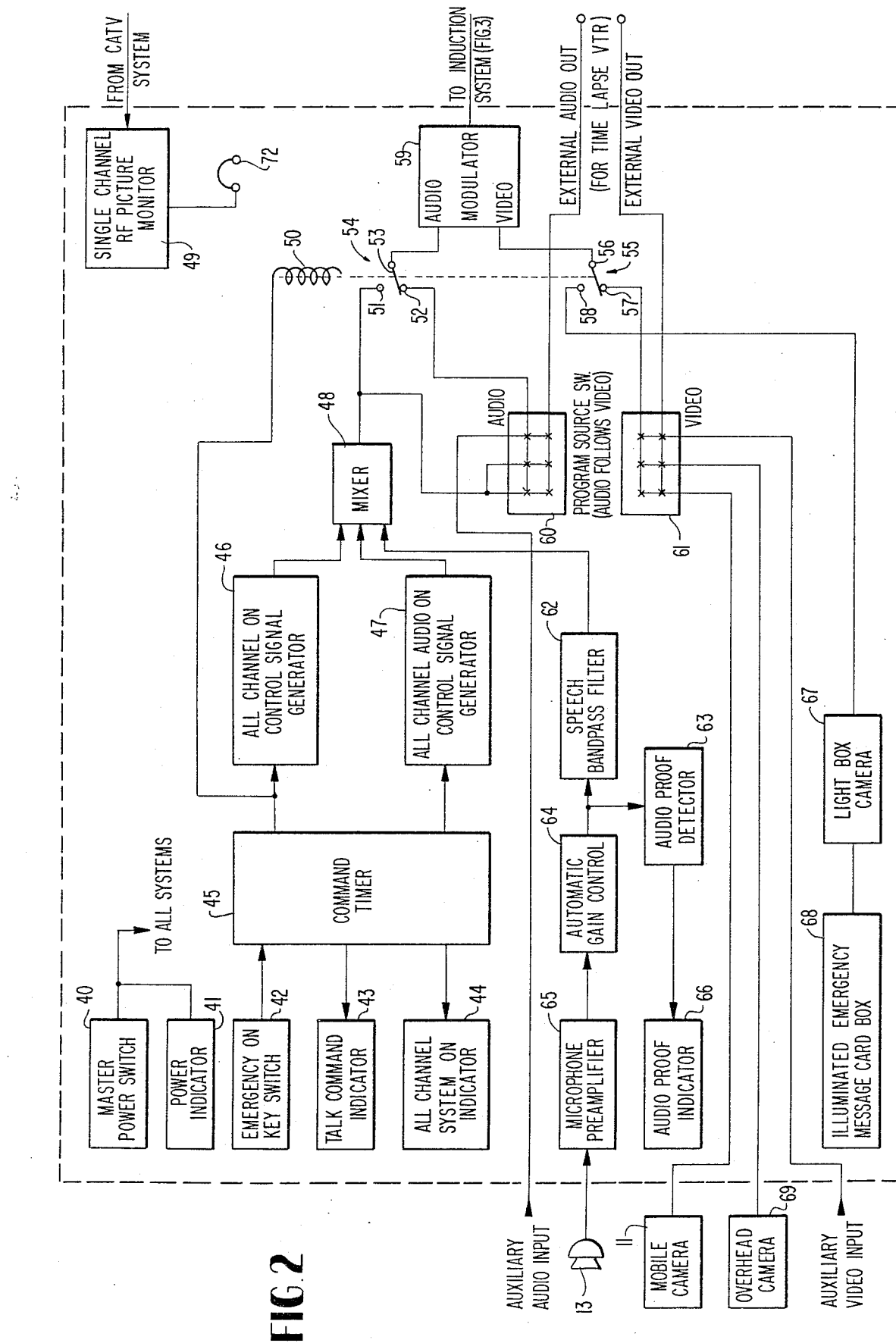

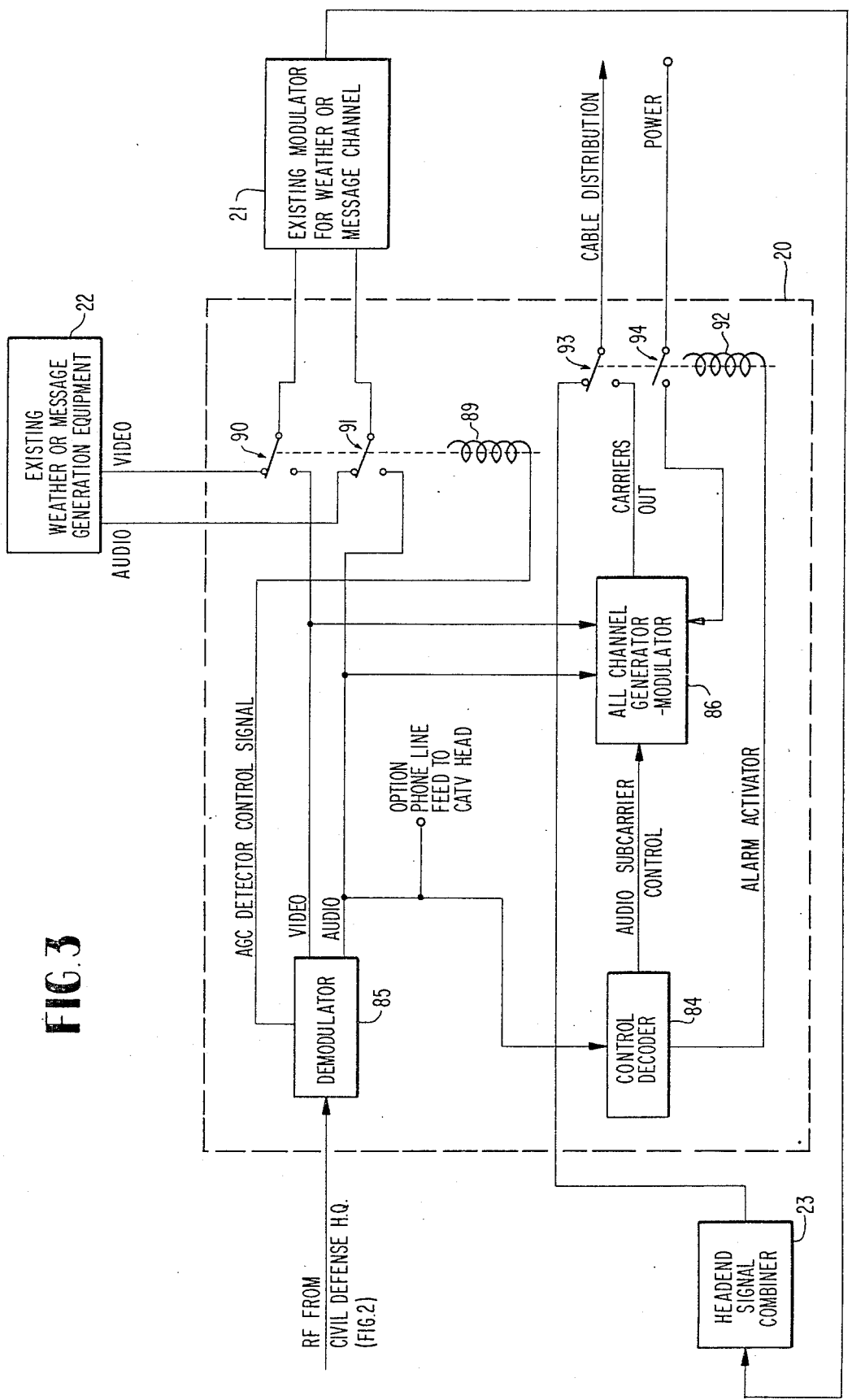

EMERGENCY CIVIL DEFENSE ALARM AND COMMUNICATIONS SYSTEMS

FIELD OF THE INVENTION

The present invention relates to a system which enables the authorized pre-emption of an entire cable television system (CATV), whereby the associated, local civil defense unit can substitute, simultaneously, for the various programs being viewed, an emergency visual and aural presentation on all received channels, both public and private.

BACKGROUND OF THE INVENTION

In present day communication systems, particularly those employing transmission links from a central television outlet to subscribers or viewers, in order to alert the television viewers to an emergency situation, it is desirable to provide a normal transmission over-ride so that emergency civil defense information, such as relating to national or local disaster, such as storms, fire, floods, etc. can be presented immediately to as large a group of the citizenry within a jurisdiction as possible.

The present invention involves a system, particularly adaptable for cable television systems, which permits central control of the distribution of visual and audio presentations from a television system, so that the normal programming will be interrupted and emergency civil defense information provided to the viewers connected to the system.

SUMMARY OF THE INVENTION

In order to provide the above-mentioned normal television transmission interrupt and over-ride, the present invention employs two basic system components, a central control facility located at civil defense headquarters, and a remote induction equipment facility, which is usually located at the CATV headend, which responds to commands from the control center and processes the information for distribution over the cable system.

For a better understanding of the present invention, attention is directed to the drawings of the present application and the description to follow, referring thereto, which explains both the make up and operation of the system.

BRIEF DESCRIPTION OF THE DRAWINGS

FIG. 1 is a block diagram of the basic system arrangement of the present invention;

FIG. 2 is a detailed component diagram of the central control facility from which a pre-emption signal for over-riding the normal television transmission emanates; and FIG. 3 is a detailed component diagram of the CATV headendsystem, particularly the induction system which receives the signals transmitted from civil defense headquarters and distributes the same to the cable system viewers.

DETAILED DESCRIPTION

In FIG. 1 of the drawings, the central control facility 1, located at civil defense headquarters, generates and transmits pre-emption signals so that announcements and instructions from the civil defense headquarters can be delivered to the CATV headend system 2, which responds to the commands from the control center 1, and processes the information for distribution over the cable system for presentation to the viewers, as by way of television homesets 30–33, which may be tuned to any of the channels associated with the cable distribution system.

Within the central control facility 1, there is an emergency control console 10, to be described hereinafter and shown in detail in FIG. 2, which provides the necessary control signals and commands both within the headquarters proper and for transmission to the CATV headend system. A mobile TV camera 11, a microphone 13 for audio input and optional television equipment 12 are associated with the emergency control console 10. This equipment permits the civil defense operator to present, both visually and orally, information relative to the emergency situation, for processing by the emergency control console 10 and transmission to the CATV headend system 2.

Within the CATV headend system 2, there is provided an induction system 20 which receives the signals transmitted from civil defense headquarters and processes the same for pre-empting normal television signal distribution, so that information directly from civil defense headquarters may over-ride the normally presented television programs and enable distribution of the necessary information to the viewers such as by way of home television sets 30–33.

Usually, the CATV headend system has a weather or message channel modulator 21 and origination equipment 22 associated therewith, and a signal combining system, for processing signals on what is normally a shared weather or message channel, which would normally be provided to present existing weather or message information, exclusive of the emergency information, to the television viewers. During the emergency situation, this shared equipment is normally by-passed so that the operator at civil defense headquarters has complete control of what information is being transmitted to the viewers' television sets.

In FIG. 2, there is shown a detailed diagram of the interconnection of the components making up the emergency control console 10, located within civil defense headquarters, and its associated video and audio equipment, employed for both presentation of information to be transmitted to the viewer and monitoring of the information being transmitted, so that the civil defense operator will be continuously aware of what the viewer is seeing and hearing.

The control center console is equipped with a master power switch 40 which, upon closure, energizes all related equipment at civil defense headquarters and makes the system ready for use. An "emergency on" key-actuated switch 42, a talk command indicator 43 and an all channel system-on indicator 44 are connected with a command timer 45. The console control 10 will also contain a video and audio program selector switch arrangement 60–61 and a television monitor 49, equipped with headphones 72, to be used by the civil defense operator for monitoring his control of the system operation.

Also included within the control console 10 are an all-channel on pre-empt signal generator 46 and an all-channel audio on control signal generator 47, connected to the command timer 45. The command timer 45 may be a Master Command Timer, manufactured by Signal Engineering and Sales Inc., (SESI) drawing number J4-266-C11-R1, Birmingham, Alabama and the generators 46 and 47 are also available from SESI.

For processing the audio information, a microphone 13 is connected to a microphone preamplifier 65, which is connected through an automatic gain control circuit 64 to a speech band pass filter 62. The output of the AGC circuit is connected also to an audio proof detector 63 and an audio proof indicator 66. Circuits 62–66 constitute an automatic level-control circuit for audio, which enables relatively constant audio levels to be maintained without operator involvement and to ensure that program audio cannot accidentally activate any of the audio-operated command circuitry.

The generators 46 and 47 and band-pass filter 62 are connected to a three-channel, line-level mixer 48, which is also available from SESI, the output of which is connected to the program source switch 60 and to contacts of the relay switch 54, which couples audio information to the RF channel modulator 59. RF modulator 59 receives both audio and video information and modulates the same for transmission to the CATV headend system.

Video information is handled by the control console through a mobile TV camera 11 and an overhead camera 69, which are coupled to the video program source switch 61. Video switch 61, like audio switch 60, is selectively connected by way of relay switch 55 to the RF modulator 59. Each of the audio and video program source switches 60 and 61 is also connected to external output lines which may be connected to a time lapse video tape recorder, and to auxiliary audio and input lines, respectively.

Additional video information is provided by way of an illuminated "Emergency Message" card-box 68 and a light box camera 67 connected to terminal 58 of relay switch 55, so that separate sources of video information may be selectively connected to the modulator for transmission to the CATV headend.

The video and audio program source switch may comprise an SESI Master-Command-Timer-Actuated Modulator Video/Audio Input Switcher and connector panel, while the light box camera 67 and the message card box 68 may comprise a Sony AVC-1400 "Emergency-Message" Card-Reading Camera with Close Up Lens, and an SESI Light Box with Card Holder, respectively.

The RF modulator 59 may be commercially available Catel VMS-2000 RF Channel Modulator, while the monitor 49 may be a Sony TV 750 RF Cable Monitor, connected for single channel operation.

The mobile television camera 11 may include a Sony AVC-3260DX Mobile Camera Ensemble. This camera ensemble advantageously may include a portable, tripod-mounted viewfinder television camera and convertible microphone for desk top, stand or lavaliere use— standard accessories for program production.

At the CATV headend system, shown in FIG. 3, the induction system 20 includes a demodulator 85, coupled to receive the RF signal from civil defense headquarters. The demodulator 85 may be a Catel VMS-2000 Demodulator Unit with Video AGC Detector/Amplifier, for developing a control signal for on-channel distribution modulator video/audio input switching. As depicted in FIG. 3, three outputs are provided from the demodulator 85, respectively corresponding to video, audio and AGC detector control signals.

Coupled to the audio output of the demodulator 85 is a control decoder 84, which may be an SESI ACD-1 Control-Audio-Decoder with a control-output for actuating a 4.5 MHz sub-carrier modulator, with a pre-empt command-control output for operating the headend output-to-cable distribution switch by way of relay 92. The audio demodulator 85 is also connected to an all channel generator modulator 86 and to one terminal of switch 91, associated with relay 89, which is activated by the AGC detector control signal from the demodulator 85. The generator-modulator 86 may comprise an SESI "Spectrum Master" All-Channel Video/Audio Carrier Generator and Modulator Unit, drawing number J4-266-B22, with a 4.5 MHz sub-channel audio-command-control input, with bridging audio and looping video program-line inputs. Power for the generator-modulator 86 is provided by way of switching terminal 94 which is actuated in response to the energization of relay 92. The energization of relay 92 also switches the contacts of switch 93 for connecting the output of the modulator 86 to the other side of the switch 93 for cable distribution.

As was mentioned previously, in the description of FIG. 1, weather or message channel equipment 21 and 22, which shares the induction system 20, is selectively disconnectable from the induction system 20 when the relay 89 is operated. Otherwise, this equipment would normally provide signals to the headend signal combiner 23 for cable distribution by way of switch 93.

The headend signal combiner 23 constitutes a multiplexed directional coupler arrangement for coupling the received RF channels to their corresponding cable channels for cable distribution through switch 93. Headend signal combiner 23 also contains the usual RF processing equipment and antenna coupling for receiving and processing the RF signals. The details of such equipment do not form a part of the present invention and an explanation thereof is not necessary for understanding the make-up and operation of the inventive system.

Assuming now that there exists an emergency situation which warrants a civil defense operator's preempting or over-riding existing cable distribution television transmissions, the operator will actuate the master power switch 40 in the emergency control console 10, to initiate the transmission of an RF signal to the CATV headend system 2. Upon reception of this signal, the demodulator 85 will apply audio and video signals to the input of the all-channel generator-modulator 86. In those cases in which this channel is shared with a weather or message channel 21, with equipment 22, the AGC detector control signal from demodulator 85 will energize relay winding 89 to switch the contacts of the switches 90 and 91 to the video and audio outputs of the demodulator 85, thereby disconnecting the weather or message generation equipment and channels 22 and 21, respectively, from the system. Thus, the initial actuation of the control center's master-power switch 40 activates the dedicated civil defense channel at the headend which is now ready for receiving program information. It should be noted, at this point, that in the above operating sequence of events, there has yet been no pre-emption, except for the shared weather or message channel.

The civil defense operator next checks the console program input-selector-switch to make sure that it is in the "mobile camera" position. He will then position the mobile camera 11 and the related microphone 13 for proper sound and picture pick-up and display, while viewing the console monitor 49 and listening with the headset monitor 72. The audio proof indicator 66 on the console panel will vary in intensity in accordance with the audio program input, thereby reassuring the operator of proper audio when he is away from the monitor headset. The console monitor receives its input from the local cable drop on the dedicated channel, thereby providing a proper indication that a complete signal loop is operational. This monitor 49 is connected for signal channel operation so that it cannot be inadvertently tuned to the wrong channel. Also, the loudspeaker circuit associated therewith is disabled so that locally generated audio feedback will not occur.

The operator now selects the appropriate emergency announcement card, containing the video information to be presented to the television set viewers, inserts it into the slot in the card box 68, thus readying the internal light box camera 67 for transmission of its all-channel pre-emptive message. The "emergency on" key switch 42 is then operated which causes the control decoder 84, connected to demodulator 85 in the induction system 20 of the CATV headend, to energize the all-channel generator-modulator 86 by connecting the switch 94 to a power supply, once the winding 92 has been activated by the alarm activation signal, as well as changing the position of switch 93 to the output of the generator-modulator 86. The generator-modulator is programmable so that, for an internally adjustable time period, the visual message which is provided by way of card box 68 at civil defense headquarters will be distributed over the cable distribution system for presentation on all channels.

Of course, with the activation of the Emergency-on key switch 42, a signal will be provided to the all channel system on indicator 44, connected to the command timer 45, and the emergency message, which is distributed by way of the CATV distribution system on the pre-empted, normally dedicated channel, will also appear on the operator's console monitor 49, thereby assuring the operator that the signal loop is operational in the pre-empt mode.

The master command timer 45, within the emergency control console 10, subsequent to a predetermined internally adjustable time period, will actuate the all-channel-audio-control-signal-on generator 46, the modulated output of which is supplied by way of mixer 48, contacts 51 and 53 of switch 54, and modulator 59 to the induction system 20 at the headend system 2, for demodulation in the demodulator 85. The relay 50, of course, has been activated by the command timer 45, so that the switches 54 and 55 have their respective terminals 53 and 56 connected to contacts 51 and 58. The control decoder 84, in response to this signal, will energize the 4.5 MHz subchannel modulator within the generator-modulator 86, thereby activating the all-channel audio capability. This automatically-timed function of the master command timer 45 also causes the talk command indicator 43 on the control console to be illuminated. By the illumination of the talk command indicator 43, the civil defense operator is advised to read an oral emergency message. The time available for the reading of the message is internally adjustable in the command timer 45. After the expiration of the predetermined time increment, the system is restored to normal program distribution, including the civil defense channel to which the television audience has been alerted to tune for additional information. The restoration of this state is indicated at the control console in civil defense headquarters by the reappearance of the civil defense studio scene on the console monitor.

If the master-command timer has been programmed to periodically repeat the pre-empted emergency announcement, the "all channel system on" alert panel indicator 44 will commence to flash on and off until the next internally adjustable timed interval has passed and pre-emption reoccurs. If the automatic mode of operation has not been selected, all-channel-pre-emption can only be reactivated by switching the Emergency-On switch 42 to the "off" position and then back to the "on" position for a manual mode of all-channel pre-empted operation. Because of this sequence of events, the civil defense operator must confine his production, dissertation or narrative to those periods between the recurring all-channel pre-emption time intervals.

For graphics presentation, a stand camera system 69, also available from SESI for graphics presentation can be accessed into the system by selecting the same via the console program selector switch. If the mobile camera unit 11 is to be utilized for other, outside scheduled or non-scheduled use, such as in a city council meeting room or mayoral office, hard-wired interconnections are connected to the auxiliary signal inputs of the console and selected on the auxiliary position of the program selector switch. With this arrangement, the audio input is at a line level for accommodating a feed from a remote microphone mixer, such as a Shure M-67.

For practical purposes, the mobile camera ensemble 11, discussed previously, includes a very fast, wide-angle fixed focal-length lens which is employed for most production during emergencies and a manual zoom lens for other types of program production for distribution from civil defense headquarters over the dedicated channel according to a desired published schedule.

In some civil defense headquarters, it may be considered necessary or desirable to produce a recording of personal performance and system operation during an actual emergency situation. A combination real-time, 7-hour time-lapse video tape video/audio recorder may be employed for this purpose. The program selector switch in the emergency control console 10 is equipped with a pair of outlets so that it can program the modulator and an external VTR simultaneously. Namely, as was explained previously in connection with the outputs of the program source switches 60 and 61, terminal connections are provided for external audio and external video outputs for a time lapse VTR. A large screen video/audio monitor-receiver-demodulator unit is provided along with the video tape recorder for playback and providing demodulated signals from the cable for recording. The unit also provides a television all-channel RF modulator for checking the CATV channels. The time lapse video/audio recorder may comprise a Sony VTR-1200 Real Time/7-Hour Time Lapse ½ EIA-J Video Tape Recorder/Playback Unit, while the receiver-demodulator unit may comprise a Sony CVM-194V Receiver/Monitor Demodulator Unit.

While the above description of the makeup and operation of the system of the present invention has been described for an induction system 20 provided at the CATV headend system, it may be necessary, in certain locales, to locate the induction system 20 downstream from the headend where the headend is remote from the origin of active cable distribution. In this circumstance, the control signal generated by the induction demodulator 85, upon reception of the RF signal from civil defense headquarters would be passed to the headend either by a dedicated telephone line or by a subchannel modulator as in a two-way system, for deactivating a co-channel modulator, if channel-sharing was required to accommodate the civil defense programming. The induction center modulator unit would then be added to the combined signals arriving on the trunk cable from the headend. Pre-emption takes place normally with this arrangement and the remote induction unit can be housed in an environmental enclosure and powered by cable-line.

It must also be assumed that in all but a very few locations, the civil defense headquarters will be located remotely from the CATV headend or the point of initiation of distribution of the main trunk-line. As a result, means must be provided to transmit the RF modulated program and control signals to the remote induction center. This can be effected by means of a dedicated RF trunk cable, but the use of upstream transmission capabilities on two-way systems and the utilization of existing remote signal pickup lines accessing headends for events such as church services, governmental meetings etc. are normally taken into consideration. The transmission link may be provided by a dedicated microwave transmission.

Still, in all instances, the system operation and performance will be as explained previously except for the predictable necessity of disabling a normally continuously operating modulator by way of a shared television channel.

From the foregoing description of the present invention it will be readily appreciated by those skilled in the art that the present emergency alarm and communication system permits simple access to and over-ride of a cable television system for providing viewers with information necessary to deal with the emergency indicated at civil defense headquarters. A significant amount of complex equipment is unnecessary and the civil defense operator has freedom to present desired video and audio information either automatically for controlled periods of time or manually, as desired.

While I have shown and described one embodiment in accordance with the present invention, it is understood that the same is not limited thereto but is susceptible of numerous changes and modifications as known to a person skilled in the art I therefore do not wish to be limited to the details shown and described herein but intend to cover all such changes and modifications as are obvious to one of ordinary skill in the art.

I claim:

1. In a television communication system, a method for pre-empting the normal distribution of television signals from a television signal sending station to television receivers over a plurality of channels, said method comprising the steps of:
    a. generating, at a control station remote from said television signal sending station, an interrupt signal and transmitting said interrupt signal to said television sending station to cause said television signal station to interrupt the normal distribution of television signals over said plurality of channels;
    b. receiving, at said television signal sending station, said interrupt signal, and in response thereto, interrupting the normal distribution of television signals over said plurality of channels;
    c. generating, at said control station, selected television signals and transmitting said selected television signals to said television signal sending station; and
    d. receiving, at said television signal sending station, said selected television signals and distributing said selected television signals over each of said plurality of channels to said television receivers.

2. A method according to claim 1, wherein one of said plurality of channels is dedicated for the transmission of signals from said control station to said television signal sending station.

3. In a cable television system wherein plural television signals are respectively received for normal distribution to television receivers, over respective channels assigned thereto, an apparatus for pre-empting said distribution of television signals to said receivers comprising;
    first means, located at a control station, remote from the cable television distribution system, for generating an interrupting signal and for supplying said interrupting signal to said cable television distribution system to cause said cable television distribution system to interrupt the normal distribution of said television signals over said respective channels, and for generated and supplying to said cable television distribution system selected television signals; and
    second means responsive to said interrupting signal and coupled directly to said cable television distribution system, for causing said distribution system to supply said selected television from said first means over each of said channels to said television receivers.

4. An apparatus according to claim 3, wherein said first means includes means for interrupting said normal distribution for only an adjustable period of time and for causing said second means to supply said selected television signals to said television receivers only during said period of time.

5. An apparatus according to claim 3, wherein said second means includes means for dedicating a prescribed one of said channels for the transmission of signals from said first means at said control station to said second means at said cable television distribution system.

6. In a television communication system, an apparatus for pre-empting the transmission of television signals from a television signal sending station to television receivers, said apparatus comprising:
    first means, located at a prescribed transmission station, for selectively generating a prescribed interrupt signal to be transmitted to a television signal sending station;
    second means, located at said prescribed transmission station and being coupled to said first means, for transmitting said prescribed interrupt signal to said television signal sending station;
    third means, located at said television signal sending station, for enabling the normal transmission of a plurality of television signals over a plurality of different channels to said television receivers by way of said sending station, and for interrupting said normal transmission of said plurality of telvision signals over each of the channels capable of being received by said television receivers upon receipt of said interrupt signal from said second means;
    fourth means, located at said prescribed transmission station, and being coupled to said second means for generating selected television signals representative of prescribed video and audio information to be supplied to said second means for transmission by said second means to said television signal sending station; and fifth means, located at said television signal sending station and being coupled to said third means, for receiving said selected television signals and for causing said third means to transmit said selected television signals to said television receivers over each of said channels;

whereby the normal transmission of plural television signals over said pulrality of different channels to said receivers by way of said sending station is pre-empted by the transmission of said selected television signals from said prescribed transmission station.

7. An apparatus according to claim 6, wherein said third means includes a signal decoder responsive to said interrupt signal from said second means, and a first switching circuit coupled thereto, said first switching circuit normally coupling television signals for transmission over the respective channels assigned thereto to said receivers and, in response to a switching signal from said decoder, upon its receipt of an interrupt signal, preventing the normal coupling of television signals for transmission over said respective channels.

8. An apparatus according to claim 7, wherein said fifth means includes a multi-channel modulator, which receives said selected television signals and couples said selected television signals by way of said first switching circuit over each of said respective channels.

9. An apparatus according to claim 6, wherein said first means includes means for permitting the transmission of said selected television signals by said second means for only an adjustable prescribed period of time and, subsequent to said prescribed period of time, enabling the reoccurrence of said normal transmission by said second means.

10. An apparatus according to claim 9, wherein said third means includes a signal decoder responsive to said interrupt signal from said second means, and a first switching circuit coupled thereto, said frist switching circuit normally coupling television signals for transmission over the respective channels assigned thereto to said receivers and, in response to a switching signal from said decoder, upon its receipt of an interrupt signal preventing the normal coupling of television signals for transmission over said respective channels.

11. An apparatus according to claim 10, wherein said fifth means includes a multi-channel modulator, which receives said selected television signals and couples said selected television signals by way of said first switching circuit over each of said respective channels.

12. An apparatus according to claim 11, further including sixth means, located at said prescribed transmission station and coupled to receive television signals being distributed at said television signal sending station, for presenting an indication of said selected television signals, being transmitted to said television receivers, thereby permitting the remote monitoring of the transmission of said selected television signals.

* * * * *